March 18, 1930. J. A. HEPPERLEN 1,751,404
SYSTEM OF MOTOR CONTROL
Filed Aug. 2, 1926
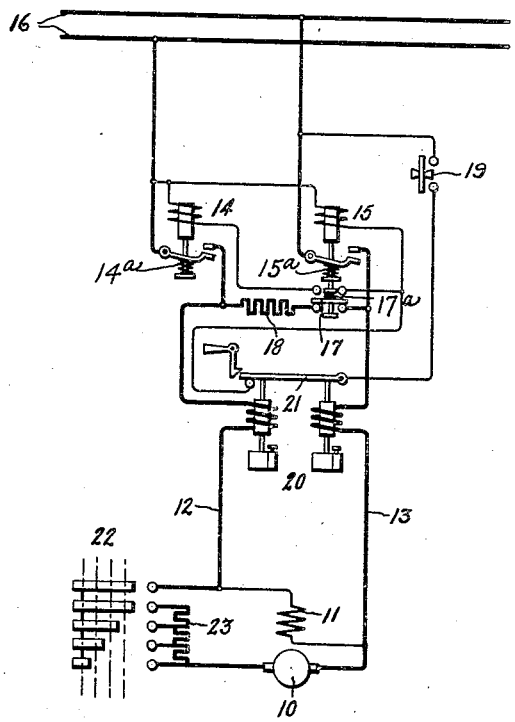
Inventor:
John A. Hepperlen;
by *Alexander S. Lunn*
His Attorney.

Patented Mar. 18, 1930

1,751,404

UNITED STATES PATENT OFFICE

JOHN A. HEPPERLEN, OF EAST ORANGE, NEW JERSEY, ASSIGNOR TO GENERAL ELECTRIC COMPANY, A CORPORATION OF NEW YORK

SYSTEM OF MOTOR CONTROL

Application filed August 2, 1926. Serial No. 126,397.

My invention relates to improvements in systems of motor control and in particular to systems whereby the shunt field winding of the motor is connected in a local discharge path when the motor is disconnected from its source of supply.

A common arrangement heretofore used has employed manually operated circuit breakers included in the supply conductors of the motor and one of the circuit breakers has been provided with a field discharge blade or clip whereby when this breaker is in its open position, the field winding of the motor is included in the local discharge path. It has been necessary to provide a certain degree of overlap between the opening of the main circuit of the motor and the closing of the field discharge circuit in order to insure that a careless operator will not fail to establish the field discharge path by neglecting to move the circuit breaker to its full open position. In other words, with said arrangement, the line circuit breaker could not be left in an intermediate position in which both the motor circuit and the field discharge circuit are open. That has the disadvantage that if the circuit breaker in the other line conductor is closed before the said circuit breaker having the field discharge clip, the field discharge path is temporarily connected directly across the supply circuit during closure of the circuit breaker having the discharge clip. An arc is thus established at the field discharge clip and this arc is not always effectively extinguished. To prevent this, the operators are instructed to first close the circuit breaker with the discharge clip and then close the other circuit breaker. These circuit breakers are not opened and closed frequently so that careless or ignorant operators often fail to close the circuit breakers in the proper order.

The principal object of the invention is to provide an arrangement in which improper operation is inherently prevented.

A further object of the invention is to provide a simple, effective, reliable arrangement in accordance with the principal object of the invention, wherein electromagnetic switches or contactors are employed as line switches, one of the contactors being provided with an auxiliary switch which normally establishes the shunt field discharge path when this contactor is open, together with a system of interconnections whereby the contactor with the auxiliary switch must close and open the field discharge circuit before the other contactor can be energized to close and connect the field winding of the motor to its source of supply.

For a better understanding of the invention, reference is had to the accompanying drawing wherein I have shown a very simplified system of motor control in accordance with the invention.

The motor 10 is indicated as of the direct current type having a shunt field winding 11 permanently connected between the supply conductors 12 and 13. Electromagnetic switches or contactors 14 and 15 are included in the circuit with the supply conductors 12 and 13 and are provided for connecting the motor to the source of supply 16. The contactor 15 is provided with an auxiliary switch 17 which is arranged to normally establish a discharge path for the shunt field 11 of the motor. This discharge path includes the supply conductors 12 and 13 and the discharge resistor 18. The auxiliary switch 17 is mechanically or otherwise suitably connected with the main movable contact of the contactor 15 so as to open the discharge path for the shunt field winding and then establish a circuit for the winding of the other line contactor 14 through the upper set of auxiliary switch contacts. The contactors 14 and 15 and the auxiliary switch 17 are suitably arranged to provide the overlap previously referred to between the opening of the main circuit of the motor and the closing of the field discharge circuit, and as shown the movable contacts of the contactors and switch are connected to their operating armatures through springs 14ª, 15ª and 17ª respectively. The operating connections with the movable contacts is such that when the contactors 14 and 15 are deenergized the switch 17 will establish the shunt field discharge path before the contactors themselves open.

The line contactors are opened under the control of the manually operable push button 19. The overload relay 20 is shown in a very conventional manner and is provided with a movable switch member 21 included in circuit with the contacts of the push button 19. Any suitable master switch mechanism may be provided in place of the push button 19. A push button has been shown since in many applications of the invention it is preferable to open and close the circuit of the line contactors under the control of a push button within easy reach of the operator. The overload relay 20 is preferably of the hand re-set type, namely, one in which after operation to effect the opening of the line contactors 14 and 15, the operator must re-set the device prior to being able to close the line contactors. The controller 22 is provided for varying the motor speed. This controller is indicated very diagrammatically and is intended to represent any suitable form of controller which functions to control the starting and stopping, and the speed of the motor. The controller 22 is indicated as of the plural position type operating to vary step by step the speed regulating resistor 23 in the armature circuit of the motor.

As thus constructed and arranged and with the parts in their respective positions indicated in the drawing the operation of my invention is as follows:—The push button 19 will be first closed, thereby energizing the winding of the contactor 15 through the contacts of the push button 19 and the switch member 21 of the overload relay. Contactor 15 in responding to the energization of its winding operates to its upper position to close its main contacts. The auxiliary switch 17 associated with contactor 15 is also operated to the upper position first opening the circuit through the discharge resistor 18 and then closing the circuit through its upper set of contacts and thus energizing the winding of the other line contactor 14. The line contactor 14 will then close and the field winding of the motor is connected to the source of supply 16.

It will be observed that since the interconnections between the contactors 14 and 15 are such that the contactor 15 must first close its main contacts and open the discharge path for the shunt field winding before the winding of contactor 14 can be energized, there is no possibility of the resistor 18 being included in a shunt circuit to the source of supply 16. Arcing in the contacts of the auxiliary switch is thus successfully prevented. It will also be observed that the contactor 14 is prevented from closing until after the contactor 15 has closed, and it will also be noted that no attention on the part of the operator is required to effect this result, it simply being necessary for him to close the push button 19 and the system inherently takes care of the desired functioning of the equipment.

The armature of the motor is connected to the source of supply by operating the controller 22. In case an overload should occur on the motor and the overload relay 20 operates to open the circuit through the line contactors 14 and 15, the contactor 15 in opening will automatically establish the discharge path for the shunt field of the motor through the discharge resistor 18 so that the motor is quickly brought to rest. By reason of the fact that the overload relay is of the hand re-set type, the switch member 21 of this relay will be prevented from automatically reclosing and thus establishing the circuit for the line contactor 15. It will be understood that with the controller in its neutral position and the motor standing idle, the shunt field circuit may be opened by opening the switch 19.

It will be seen from the above that I have provided a simple and effective arrangement whereby the disadvantages of the prior arrangement are inherently taken care of so that even a careless or unskilled operator is prevented from operating the equipment in such a way as to cause a destructive arc to be formed at the contacts of the field discharge resistor switch.

What I claim as new and desire to secure by Letters Patent of the United States, is:

1. In combination, an electric motor having a shunt field winding, a pair of line switches, an auxiliary switch associated with the first of said line switches, a discharge path for said field winding normally established by said auxiliary switch when said first line switch is in its open position, and connections between said line switches requiring the closing of said first line switch and the opening of the said discharge path by said auxiliary switch prior to the closing of the second of said line switches.

2. In combination an electric motor having a shunt winding, a pair of line contactors, an auxiliary switch associated with the first of said contactors, a discharge path normally established by said auxiliary switch when said first contactor is in its open position, means for causing said auxiliary switch to establish said discharge path prior to the opening of said first contactor and connections between said line contactors controlled by said auxiliary switch requiring the closing of said first line contactor and the opening of said discharge path by said auxiliary switch prior to the closing of said line contactors.

3. In combination, an electric motor having a shunt field winding, a pair of normally open line contactors having closing windings, an auxiliary switch associated with the first of said contactors, a discharge resistor normally included in circuit with said field winding by said auxiliary switch when said first contactor is in its open position, and connections between said contactors requiring the opening of the circuit through said resistor by said auxiliary switch and then the closing of the first of said contactors prior to the energization of the second of said contactors through said auxiliary switch.

4. In combination, an electric motor having a shunt field winding, supply conductors, a contactor included in the circuit of each of said conductors, the first of said contactors having an auxiliary switch, a field discharge resistor interposed between said contactors and said motor and connected between said conductors by said auxiliary switch when the said first contactor is in its open position, master switch mechanism for controlling the opening and closing of said contactors, and connections through which operation of said master switch mechanism to effect the closing of said contactors causes said first contactor to be energized and closed and the auxiliary switch associated therewith to open the circuit through said field discharge resistor and establish an energizing circuit for the second contactor to close, the said connections being such that operation of said master switch mechanism to open said contactors causes the said auxiliary switch to interrupt the energizing circuit of said second contactor and include said resistor in a local discharge circuit with the field winding of said motor.

In witness whereof, I have hereunto set my hand this 30th day of July, 1926.

JOHN A. HEPPERLEN.